(12) United States Patent  
Campbell et al.

(10) Patent No.: US 9,127,183 B2  
(45) Date of Patent: Sep. 8, 2015

(54) WATER-IMPERVIOUS, REMOVABLE CAULK AND SEALANT COMPOSITION

(71) Applicant: FLOODFOAM, INC., St. Petersburg, FL (US)

(72) Inventors: G. Blair Campbell, St. Petersburg, FL (US); Nick Conley, Redwood City, CA (US)

(73) Assignee: FLOODFOAM, INC., St. Petersburg, FL (US)

( * ) Notice: Subject to any disclaimer, the term of this patent is extended or adjusted under 35 U.S.C. 154(b) by 380 days.

(21) Appl. No.: 13/748,151

(22) Filed: Jan. 23, 2013

(65) Prior Publication Data

US 2013/0136882 A1 May 30, 2013

Related U.S. Application Data

(63) Continuation-in-part of application No. 12/638,449, filed on Dec. 15, 2009, now Pat. No. 8,415,427.

(51) Int. Cl.
    C09D 125/08 (2006.01)
    C08K 5/01 (2006.01)
    C09D 5/34 (2006.01)

(52) U.S. Cl.
    CPC ............... *C09D 125/08* (2013.01); *C08K 5/01* (2013.01); *C09D 5/34* (2013.01); *Y10T 428/139* (2015.01); *Y10T 428/1397* (2015.01)

(58) Field of Classification Search
    CPC ..................................................... C09D 125/08
    USPC ......................................................... 524/572
    See application file for complete search history.

(56) References Cited

U.S. PATENT DOCUMENTS

| 2,348,447 | A | 5/1944 | Bock |
| 3,267,063 | A | 8/1966 | Hudson |
| 4,764,535 | A | 8/1988 | Leicht |
| 5,925,706 | A | 7/1999 | Roberts |
| 6,284,077 | B1 | 9/2001 | Lucas |
| 6,291,536 | B1 | 9/2001 | Taylor |
| 6,333,365 | B1 | 12/2001 | Lucas |
| 6,395,794 | B2 | 5/2002 | Lucas |
| 6,414,044 | B2 | 7/2002 | Taylor |
| 6,528,122 | B2 | 3/2003 | Cordova |
| 6,713,522 | B2 * | 3/2004 | Zhang et al. .................. 521/170 |
| 2002/0013402 | A1 | 1/2002 | Fisher |
| 2005/0154121 | A1 | 7/2005 | Fan et al. |
| 2008/0057317 | A1 | 3/2008 | Kettner |

FOREIGN PATENT DOCUMENTS

JP 07-070531 A 3/1995

* cited by examiner

*Primary Examiner* — Doris Lee  
(74) *Attorney, Agent, or Firm* — Larson & Larson, P.A.; Frank Liebenow; Patrick Reid

(57) ABSTRACT

A stable caulk or sealant composition containing as principal ingredients styrene-ethylene/butylene-styrene copolymer, heptane solvent, and a resin is disclosed. The composition is generally employed in a canister pressurized with a propellant to expel a stream of water-impervious sealant to fill cracks, crevices and gaps to water damage. When desired, the sealant is removable from the application area, typically by manually pulling (e.g., with one's bare hands). In some embodiments, a propellant is added with the sealant in a container to propel the sealant out of the container when the sealant is applied.

14 Claims, 3 Drawing Sheets

WATER-IMPERVIOUS, REMOVABLE CAULK AND SEALANT COMPOSITION

CROSS-REFERENCE TO RELATED APPLICATION

This application is a continuation-in-part of U.S. patent application Ser. No. 12/638,449, filed Dec. 15, 2009, the disclosure of which is hereby incorporated by reference.

FIELD

A sealant composition is described for use in preventing the intrusion of water. More specifically, a removable water sealant composition of heptanes, copolymers (e.g., styrene-ethylene/butylene-styrene), resin, and a propellant is described.

BACKGROUND

Polymeric materials have been used as sealants to fill cracks, crevices or gaps in various useful structures. These polymeric materials prevent water, dirt or other contaminants from passing through such cracks, crevices or gaps. Such prior art sealants, after a period of time, allow water to enter the structure that is to be protected. Furthermore, prior sealants bond to structural materials such as metal and wood, making them less usable where non-permanent solutions are required. For example, using the prior sealants to fill around a door or window upon notice of a possible flood will help reduce water seepage, but after the flood subsides, such sealants are very difficult to remove from the doors, windows, etc. Removal of such prior sealants require significant force and most often require a tool such as a scraper, file, or wedge of some sort to pull the bulk of the prior sealant from the surface to which it has bonded, but even after scraping with such tools, some residual amount of the prior sealant often remains on the surface, requiring sanding and refinishing. In some cases, a petroleum-based solvent is required to remove the prior sealant from these surfaces, but the same solvent used to remove the prior sealant, often removes paint or other finishes from these surfaces, again requiring refinishing, etc.

There is a continuing need for a long lasting sealant that will continue to seal cracks, crevices or gaps in structures from water intrusion that is removable by pulling with little or no residue.

SUMMARY

The composition of this invention provides a novel group of components including a styrene-ethylene/butylene-styrene copolymer, a solvent such as heptanes and a resin such as Norsolene A-100 along with a propellant such as nitrogen gas.

In one embodiment, the sealant includes styrene-ethylene/butylene-styrene, heptanes, and resin that when added to a canister and charged with a propellant provides a water-impervious sealant that is sprayed or injected onto/into cracks, crevices, gaps in structured members, etc. The resultant water-impervious layer also provides long term resistance from water intrusion into the structural members, such as cable boxes, telephone boxes, electrical boxes, marine products, etc.

In another embodiment, a water-impervious sealant composition includes about 32 to 60 percent by weight styrene-ethylene/butylene-styrene copolymer, about 40 to 60 percent by weight of one or more solvents, and from 2 to about 6 percent by weight of a resin such as Norsolene A-100.

In another embodiment, a water-impervious sealant composition includes about 32 to 60 percent by weight styrene-ethylene/butylene-styrene copolymer, about 40 to 60 percent by weight of one or more solvents, from 2 to about 6 percent by weight of a resin such as Norsolene A-100, and from 1 to 3 percent by weight of a propellant (e.g. nitrogen).

In another embodiment, a water-impervious sealant composition includes 37% styrene-ethylene/butylene-styrene copolymer, 59% heptanes, and 4% Norsolene A-100.

In another embodiment, a water-impervious sealant composition includes 36% styrene-ethylene/butylene-styrene copolymer, 58% heptanes, 4% Norsolene A-100 and 2 percent by weight of a propellant (e.g. nitrogen).

In another embodiment, a method of making a water-impervious sealant includes adding about 32 to 60 percent by weight styrene-ethylene/butylene-styrene copolymer, from 2 to about 6 percent by weight of a resin such as Norsolene A-100, and about 40 to 60 percent by weight of heptanes into a canister forming the sealant, charging the canister with a propellant (e.g. nitrogen) and sealing the canister.

In another embodiment, a method of making a water-impervious sealant includes adding 38 percent by weight styrene-ethylene/butylene-styrene copolymer, 57 percent by weight heptanes, 4 percent by weight of resin such as Norsolene A-100, and 1 percent by weight of nitrogen.

BRIEF DESCRIPTION OF THE DRAWINGS

The composition can be best understood by those having ordinary skill in the art by reference to the following detailed description when considered in conjunction with the accompanying drawings in which.

DETAILED DESCRIPTION

Figure 1:
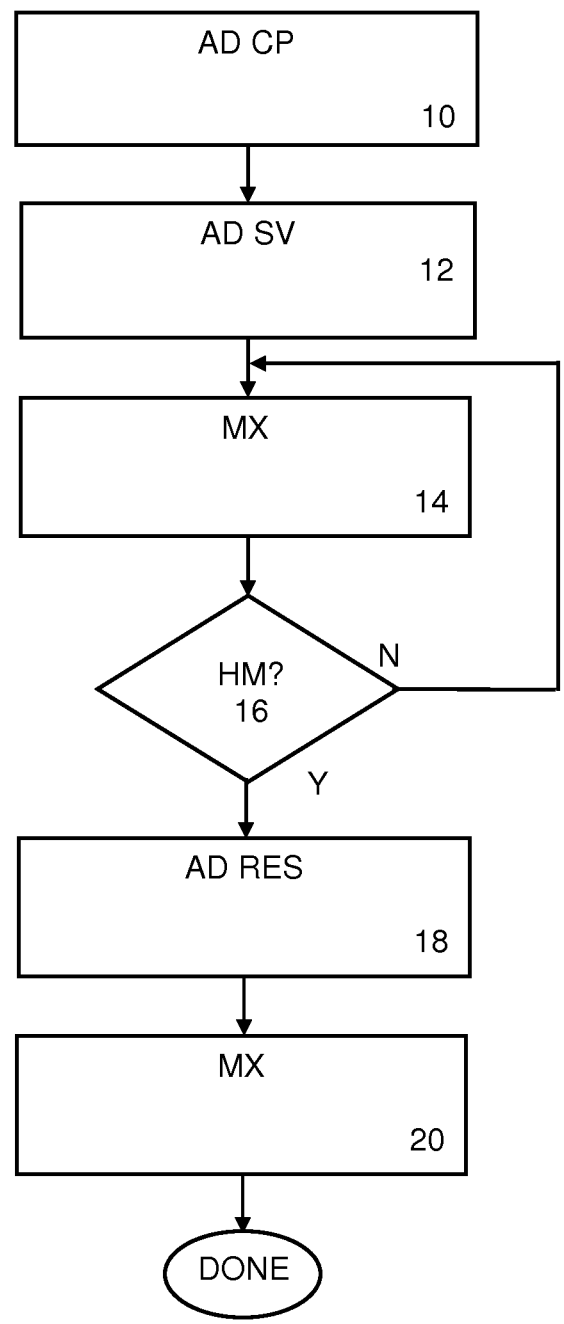
FIG. 1 is a flow chart of mixing the ingredients.

Throughout the following detailed description, the same reference numerals refer to the same elements in all figures.

In one embodiment, the composition employed is comprised of the following compounds by weight percent:

| | |
|---|---|
| Styrene-ethylene/butylene-styrene copolymer | 40.6% |
| Solvent (e.g. heptanes) | 59.4% |

In a second embodiment, the composition employed in this composition is comprised of the following compounds by weight percent:

| | |
|---|---|
| Styrene-ethylene/butylene-styrene copolymer | 37% |
| Solvent (e.g. heptanes) | 57% |
| Resin (e.g. Norsolene A-100) | 4% |
| Propellant (e.g. nitrogen) | 2% |

In a third embodiment, the composition employed is comprised of the following compounds by weight percent:

| | |
|---|---|
| Styrene-ethylene/butylene-styrene copolymer | 32% - 60% |

| Solvent (e.g. heptanes) | 40% - 60% |
| Resin (e.g. Norsolene A-100) | 2% - 6% |
| Nitrogen | 1% - 3% |

Although many compositions of copolymer are known comprising styrene and rubber, a blend of 13% styrene and 87% rubber as provided, for example, in a product called Kraton G1657 is preferred, though not required.

The preferred solvent is heptane, although it is anticipated that the solvent is any known solvent or combination of solvents such as tetrahydrofuran, hexanes, petroleum ether, and D-limonene.

The preferred resin is Norsolene A-100, although it is anticipated that the resin is any known resin.

In a fourth embodiment, the composition is comprised of the following compounds by weight percent:

| Styrene-ethylene/ butylene-styrene copolymer | 37.6% |
| Solvent (e.g. heptanes) | 56.8% |
| Resin (e.g. Norsolene A-100) | 3.8% |
| Nitrogen | 1.8% |

Although many compositions of copolymer are known comprising styrene and rubber, a blend of 13% styrene and 87% rubber as provided, for example, in a product called Kraton G1657 is preferred, though not required.

The preferred solvent is heptane, although it is anticipated that the solvent is any known solvent or combination of solvents such as tetrahydrofuran, hexanes, petroleum ether, diethyl ether, and D-limonene.

The preferred resin is Norsolene A-100, although it is anticipated that the resin is any known resin.

For pressurized canisters, it is preferred that the canister be filled with from 80 percent to 99 percent of the composition described above and from 1-20% of a propellant (e.g. nitrogen gas). The examples above cite 1-3% of propellant and cite nitrogen as an example, though it is anticipated that other propellants that exist in liquid form under pressure (e.g., butane, isobutene, propane) are also suitable and, depending upon the propellant, this amount ranges up to 20%

For embodiments that are provided in a tube, such as a caulking tube, no propellant is required.

Referring to FIG. 1, the composition is prepared by adding the styrene-ethylene/butylene-styrene copolymer 10 and adding the solvent (heptanes) 12 into a mixer and mixing 14. If the mixture isn't clear 16 and isn't homogeneous, repeat the mixing 14 until the mixture becomes clear and homogeneous. When the mixture is clear and homogenous 16, the resin (e.g. Norsolene A-100) is added 18 and mixed 20 until the composition is homogenous.

Some embodiments are provided in a tube while other embodiments are provided in a dispenser or canister. For embodiments that are provided in a tube, such as a caulking tube, no propellant is required.

Figure 2:
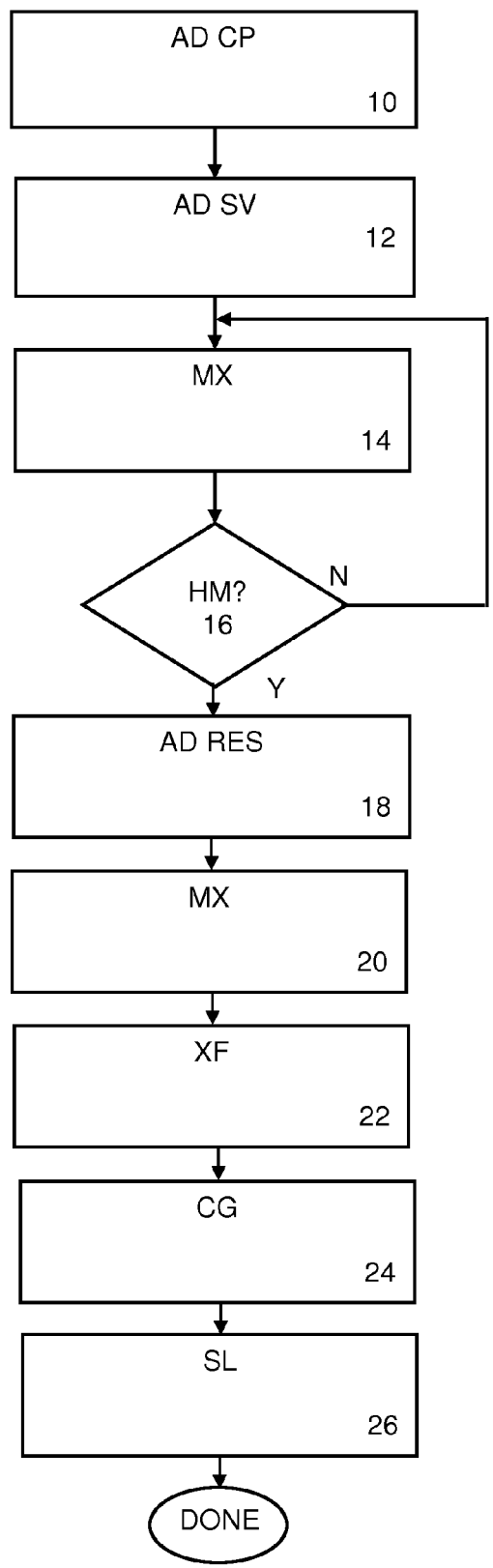
FIG. 2 is a flow chart of mixing the ingredients.

Referring to FIG. 2, for embodiments that are dispenser-based, the composition is prepared by adding the styrene-ethylene/butylene-styrene copolymer 10 and adding the solvent (heptanes) 12 into a mixer and mixing 14. If the mixture isn't clear 16 and isn't homogeneous, repeat the mixing 14 until the mixture becomes clear and homogeneous. When the mixture is clear and homogenous 16, the resin (e.g. Norsolene A-100) is added 18 and mixed 20 until the composition is homogenous. The composition is then transferred to a canister 22 and charged 24 with a suitable amount of the propellant, such as nitrogen, propane, n-butane, isobutane or dimethyl ether and then sealed 26. The seal is provided with a means to selectively release the contents (nozzle/valve). Upon operation of the means to selectively release, pressure in the dispenser/canister expels a strand of the composition onto/into a target crack, crevice, gap, etc and the composition expands to fill the target crack, crevice, gap, etc. The propellant is added in an amount proportional to the canister/valve construction and desired flow rate. Although any ratio of the composition to propellant is anticipated, about 1-20 weight percent based on the total composition weight is preferred for most canister/valve systems.

Figure 3:
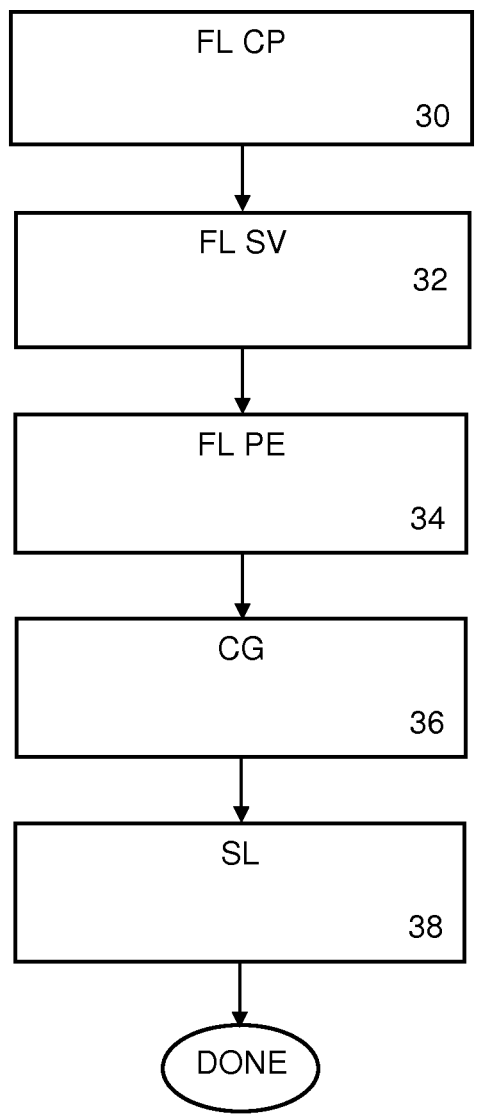
FIG. 3 is a second flow chart of mixing the ingredients.

Referring to FIG. 3, for embodiments that are dispenser-based, another way to prepare the composition is by filling the canister with the specified amount of the styrene-ethylene/butylene-styrene copolymer 30 and adding the specified amount of the solvent 32 into the canister, and adding the specified amount of the resin 34 (e.g. Norsolene A-100) into the canister. It is preferred that the canister be filled to from 80% up to 99% with the above ingredients, leaving from 1% to 20% for the propellant. The canister is then charged 36 with a suitable amount of the propellant, such as nitrogen, propane, n-butane, isobutene, dimethyl ether, or a mix of hydrocarbon and dimethyl ether up to its total fill volume (the recommended level to which the canister is specified to be filled); and then sealed 38. The seal is provided with a means to selectively release the contents (nozzle/valve). Upon operation of the means to selectively release, pressure in the dispenser/canister expels a strand of the composition onto/into a target crack, crevice, gap, etc and the composition expands to fill the target crack, crevice, gap, etc. The propellant is added in an amount proportional to the canister/valve construction and desired flow rate. Although any ratio of the composition to propellant is anticipated, about 1-20 weight percent based on the total composition weight is preferred for most canister/valve systems.

In some embodiments, the means for selectively releasing is a top valve to selectively open the container and allow expulsion of the pressurized composition and close the canister after the desired amount of the composition has been applied.

For embodiments that are that are provided in a tube, the composition is transferred to a tube and a strand of the composition is expelled upon pressure from an external source such as squeezing of the tube by hand or from pulling the trigger of a caulking gun.

The composition has many uses such as a temporary flood barrier for doors and low level windows. It is useful to removably seal gaps in cable boxes, electrical boxes, telephone boxes, and close gaps around protective ply-board for windows and doors during a hurricane or other flood danger. It is useful as a sealant in a myriad of marine and plumbing environments. The disclosed compositions temporarily adhere to surfaces such as cement, wood, aluminum, painted surfaces, etc. Once cured, the disclosed compositions maintain a sufficiently water-tight barrier as to prevent/reduce damage from high water. After the seal is no longer needed/desired (e.g. the water subsides), removal of the disclosed compositions (after curing) is typically performed by pulling on the sealant with one's hands and fingers, without the need for scraping (though for some small crevices, it may be difficult for a person to reach and therefore a tool may be helpful). When pulled with sufficient manual force, the cured sealants separate from the surfaces with minimal or no residual sealant remaining on the surfaces.

A typical composition contains Styrene-ethylene/butylene-styrene copolymer at 32-60 weight percent, Heptanes at 40-60 weight percent and Resin (e.g. Norsolene A-100) at 2-6 weight percent.

For example, 56.8 percent by weight heptanes is mixed with 37.6 percent by weight styrene-ethylene/butylene-styrene copolymer and 3.8 Resin percent by weight (e.g. Norsolene A-100) until the mixture is clear and homogenous. The mixture is poured into a canister and 1.8 percent of total mass in the container is filled with nitrogen as a propellant.

In another example, 56.8 percent by weight heptanes is mixed with 37.6 percent by weight styrene-ethylene/butylene-styrene copolymer and 3.8 Resin percent by weight (e.g. Norsolene A-100) until the mixture is clear and homogenous. The mixture is poured into a canister and 1.8 percent of total mass in the container is filled with nitrogen as a propellant.

In another example, 57 percent by weight heptanes, mixed with 37 percent by weight styrene-ethylene/butylene-styrene copolymer and 4 percent by weight resin (e.g. Norsolene A-100) are mixed together until the mixture is clear and homogenous. The mixture is poured into a canister and 2 percent of total mass in the container is filled with nitrogen as a propellant.

With any of the above examples, before, for example, a flood, a valve on the canister is depressed to express a stream of the resulting sealer for filing a gap around doors, windows, etc. After the danger of flood resides, the cured/dried sealer is removable from the doors or windows by, preferably, pulling the cured sealant by hand, thereby limiting potential damage to the doors, windows, frames, etc.

The composition has been described with respect to a particular embodiment. Numerous equivalents of this composition will be obvious to those skilled in the art. The following claims generally should be construed to cover all such equivalents which are within the true spirit and scope of the composition.

What is claimed is:

1. A water-impervious, non-permanent sealant composition comprising:
   about 32-60 percent by weight styrene-ethylene/butylene-styrene copolymer;
   about 40-60 percent by weight of one or more solvents;
   about 2-6 percent by weight of a resin; and
   about 2%-6 percent by weight of a propellant.

2. The water-impervious sealant composition according to claim 1, wherein the solvents are selected from the group consisting of heptanes, tetrahydrofuran, hexanes, and D-limonene.

3. The water-impervious sealant composition according to claim 1, wherein the one or more solvents is a heptane.

4. The water-impervious sealant composition according to claim 1, wherein the sealant is provided in a canister, the canister having a valve for selectively releasing the water-impervious sealant from the canister, a propellant is added to the water-impervious sealant within the canister, the propellant is one or more materials selected from the group consisting of propane, nitrogen, n-butane, isobutane, and dimethyl ether.

5. The water-impervious sealant composition according to claim 4, wherein the propellant is nitrogen.

6. The water-impervious sealant composition according to claim 1, wherein the composition is provided in a tube.

7. A water-impervious, non-permanent sealant composition comprising:
   about 37.6 percent by weight styrene-ethylene/butylene-styrene copolymer;
   about 56.8 percent by weight of one or more solvents;
   about 3.8 percent by weight of a resin; and
   about 1.8 percent by weight of nitrogen.

8. The water-impervious sealant composition according to claim 7, wherein the solvents are selected from the group consisting of heptanes, tetrahydrofuran, hexanes, and D-limonene.

9. The water-impervious sealant composition according to claim 7, wherein the one or more solvents is a heptane.

10. The water-impervious sealant composition according to claim 7, wherein the sealant is provided in a canister, the canister having a valve for selectively releasing the water-impervious sealant from the canister.

11. A water-impervious, non-permanent sealant composition comprising:
    about 37 percent by weight styrene-ethylene/butylene-styrene copolymer;
    about 57 percent by weight of a solvent;
    about 4 percent by weight of a resin; and
    about 2 percent by weight of nitrogen.

12. The water-impervious sealant composition according to claim 11, wherein the solvent is selected from the group consisting of heptanes, tetrahydrofuran, hexanes, and D-limonene.

13. The water-impervious sealant composition according to claim 11, wherein the solvent is a heptane.

14. The water-impervious sealant composition according to claim 11, wherein the sealant is provided in a canister, the canister having a valve for selectively releasing the water-impervious sealant from the canister.

* * * * *